Patented July 31, 1951

2,562,350

UNITED STATES PATENT OFFICE 2,562,350

BASIC ESTERS OF BILE ACIDS

Robert R. Burtner, Skokie, Ill., assignor to G. D. Searle & Co., Chicago, Ill., a corporation of Illinois No Drawing. Application October 12, 1945, Serial No. 622,081

5 Claims. (Cl. 260—397.1)

This invention relates to a group of new compounds which are basic esters of natural and synthetic bile acids, and which may be used with advantage as antispasmodic agents. More specifically, it relates to the esters in which hydroxy and keto substitution products of cholanic acid are esterified with certain tertiary-amino substituted ethanols and propanols. These esters may be obtained as viscous oils or glassy masses which are insoluble in water but readily soluble in a variety of organic solvents, or these oily or glassy basic esters may be converted into salts, which are generally crystalline, by neutralization with an equivalent quantity of any convenient non-toxic organic or inorganic acid. Such salts are in general soluble in water and since they manifest all of the advantages of the esters as disclosed herein, they constitute a preferred form for preparing and using these compounds. Though I have found the hydrochloride salts convenient to prepare and use, it will be understood that other salts may be employed and that the esters described in the appended claims may be in the form of the free base or any of its salts.

The structure of the compounds of this invention may be represented by the formula

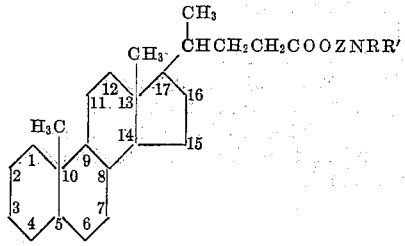

in which all of the ring structures are completely saturated; in which the hydrogen atoms attached to one or more of the carbon atoms numbers 3, 7 and 12 are replaced by a member of the class consisting of (=O) and

in which Z represents an ethylene, propylene or trimethylene group, and R and R' each represent alkyl groups containing not more than four carbon atoms, or together may represent a pentamethylene chain. The substituted bile acids from which these esters are obtained are well known in the prior art. The hydroxy acids and certain of the keto acids may be isolated from mammalian bile or prepared from other hydroxylated cholanic acids by appropriate synthetic procedures; most of the keto acids are best prepared by oxidation of the corresponding hydroxy acids.

The esters of this invention and their salts are best prepared by heating the appropriately substituted bile acid with a tertiary aminoalkyl halide in isopropanol solution, recovering the basic ester from the reaction mixture, and converting the free base to the desired salt, as described in greater detail in the following examples.

*Example 1.*—Thirty-nine and three-tenths grams (39.3 gm.) of pure, solvent-free desoxycholic (3,12-dihydroxycholanic) acid are dissolved in 150 cubic centimetres of warm isopropanol. To this solution 13.5 gm. of β-diethylaminoethyl chloride are added and the mixture is then boiled under a reflux condenser for two hours. The solvent is then removed under reduced pressure, and the viscous residue poured into two liters of water containing 8 gm. of sodium hydroxide. The basic ester which separates is extracted from the alkaline liquor by washing several times with benzene. Acidification of this aqueous liquor after completion of the extraction will yield some unreacted desoxycholic acid. Part of the benzene is removed from the extract by distillation and the remaining clear solution is treated with an exact equivalent of a solution of hydrogen chloride in anhydrous ethanol to precipitate the ester hydrochloride in a flocculent form. This is filtered and dried in a vacuum. It may be purified by crystallization from methyl ethyl ketone, but even when so purified, it is too hygroscopic to permit satisfactory determination of its melting point. The β-diethylaminoethyl desoxycholate hydrochloride thus obtained is readily soluble in water and in alcohol. By the use of other anhydrous acids (in place of the hydrogen chloride) in anhydrous ethanol, other corresponding salts of the basic ester may be obtained if desired.

*Example 2.*—Thirty-seven and seven-tenths grams (37.7 gm.) of lithocholic (3-hydroxy-cholanic) acid and 19 gm. of β-dibutylaminoethyl chloride are caused to react, and the hydrochloride of the resulting ester is precipitated as described in Example 1. The identity of the β-dibutylaminoethyl lithocholate hydrochloride thus obtained my be confirmed by appropriate elementary analyses, as may be done in the case of each of the other compounds described in these specific examples.

*Example 3.*—Forty and eight-tenths grams (40.8 gm.) of cholic (3,7,12-trihydroxycholanic)

acid are dissolved in hot isopropyl alcohol and then reacted with 13.5 gm. of β-diethylaminoethyl chloride as described in Example 1. The basic ester is extracted from the aqueous alkaline liquor with ether, the ether solution dried over anhydrous sodium sulfate, and the pure free base then obtained as a viscous glassy mass by evaporation of the solvent. This base may be converted to a salt by dissolving it in ether and adding one equivalent of the desired acid dissolved in anhydrous ethanol. In this manner the hydrochloride of β-diethylaminoethyl cholate is obtained as a flocculent precipitate which becomes granular upon standing at room temperature for a few hours. It is very soluble in cold water and alcohol, and is exceedingly hygroscopic. For these reasons it could not be recrystallized, nor could a melting point be accurately determined.

*Example 4.*—By substituting 15 gm. of β-piperidinoethyl chloride for the β-diethylaminoethyl chloride in Example 3, the β-piperidinoethyl cholate and its hydrochloride may be obtained as substances whose physical properties closely resemble those described in that example.

*Example 5.*—Forty and eight-tenths grams (40.8 gm.) of dehydrocholic (3,7,12-triketocholanic) acid and 13.5 gm. of β-diethylaminoethyl chloride are reacted in 500 cc. of boiling isopropanol, and the hydrochloride of the resulting β-diethylaminoethyl dehydrocholate is precipitated, all by the procedure as described in Example 1. The amorphous precipitate of the hydrochloride obtained from the alcohol-benzene liquor may be dried in a vacuum and recrystallized from isopropanol to yield a product whose melting point is 229° centigrade. It is readily soluble in water.

*Example 6.*—Two hundred seventeen grams (217 gm.) of dehydrodesoxycholic (3,12-diketocholanic) acid and 81.3 gm. of β-diethylaminoethyl chloride are refluxed together in 660 cc. of isopropanol, and the oily ester base precipitated from water and extracted with benzene as described in Example 1. Much of the benzene is removed from the extract by distillation, and a solution containing one equivalent of hydrogen chloride in anhydrous ethanol is added. The resulting solution is cooled and poured slowly into 4750 cc. of ether during vigorous stirring. The precipitate soon granulates, and is filtered, washed with fresh ether, and dried in a vacuum over sodium hydroxide. The β-diethylaminoethyl dehydrodesoxycholate hydrochloride thus obtained may be purified by crystallization from methyl ethyl ketone, and when so purified melts at approximately 187° centigrade. It is readily soluble in water and alcohol, and sufficiently hygroscopic to render determination of the melting point uncertain.

Operating in a similar manner, the β-piperidinoethyl, β-dimethylaminoethyl, β-diethylaminopropyl and γ-diethylaminopropyl esters of dehydrodesoxycholic acid may be obtained as hydrochlorides which are similarly hygroscopic, readily soluble in water, and frequently difficult to crystallize satisfactorily. It will be understood that the above examples are illustrative only, and are in no way intended to limit this invention other than as set forth in the appended claims.

The compounds of this invention are useful in therapy, particularly as spasmolytic agents. Generally speaking, they are capable of relaxing smooth muscle spasms either neurotropic or musculotropic in origin. They appear to be effective in various kinds of smooth muscle, as typified conveniently by intestinal and uterine strips. The potency of the individual compounds of this invention naturally varies from one to another, but the more potent species approach in quantitative activity the levels reported for some of the widely used natural and synthetic spasmolytic agents. For example, diethylaminoethyl dehydrodesoxycholate hydrochloride (a preferred compound of this invention) is approximately as effective as diethylaminoethyl fluorene-9-carboxylate hydrochloride (a synthetic spasmolytic agent widely used in this country under the trade-name "Pavatrine" and described and claimed by me in United States Letters Patent No. 2,262,754, dated November 18, 1941) in relaxing spasms of intestinal strips caused by barium ions (considered to be typical of musculotropic spasms). It is but slightly less potent than the same reference compound in relaxing intestinal spasms induced by acetylcholine (considered to be typical of neurotropic spasms). Its toxicity on intraperitoneal administration (in mice) is about the same as the reference compound, but it is appreciably less toxic on oral administration. Likewise diethylaminoethyl desoxycholate hydrochloride is but a little less potent than the corresponding dehydrodesoxycholate as described above, though it is slightly more toxic than that compound.

The esters of ketocholanic acids are claimed in my copending application Serial No. 79,731, filed March 4, 1949.

As shown above, these compounds are useful as spasmolytic agents for relaxing smooth muscle tissue in general. However, the compounds of this invention are unique among all spasmolytic agents in that they possess the bile acid structure as the major portion of their molecule. It is well known that bile acids and their common derivatives are selectively secreted and concentrated into the bile. Consequently, the compounds described and claimed herein are of peculiar and unique interest in spastic states involving the gall bladder and other structures through which bile is secreted and passed.

I claim:

1. As a new composition of matter, a dialkylaminoalkyl ester of a hydroxycholanic acid wherein there is at least one hydroxyl radical attached to at least one of the carbon atoms numbers 3, 7 and 12 and the dialkylaminoalkyl group has the formula

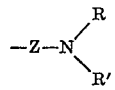

wherein Z is an alkylene radical containing between one and four carbon atoms and R and R' are alkyl radicals containing not more than four carbon atoms.

2. As a new composition of matter, a dialkylaminoalkyl ester of desoxycholic acid wherein the dialkylaminoalkyl group has the formula

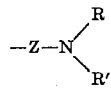

wherein Z is an alkylene radical containing between one and four carbon atoms and R and R' are alkyl radicals containing not more than four carbon atoms.

3. As a new composition of matter, a β-dialkylaminoethyl ester of desoxycholic acid wherein the alkyl radicals of said β-dialkylaminoethyl group contain not more than four carbon atoms.

4. As a new composition of matter, the β-diethylaminoethyl ester of desoxycholic acid.

5. As a new composition of matter, β-diethylaminoethyl desoxycholate hydrochloride.

ROBERT R. BURTNER.

REFERENCES CITED

The following references are of record in the file of this patent:

UNITED STATES PATENTS

| Number | Name | Date |
|---|---|---|
| 2,313,016 | Horenstein | Mar. 2, 1943 |